Oct. 21, 1924.
P. GROSHEK
1,512,844
MATERIAL SHOVELING, TRANSPORTING, AND TRUCKING MACHINE
Filed Nov. 23, 1922　　7 Sheets-Sheet 5
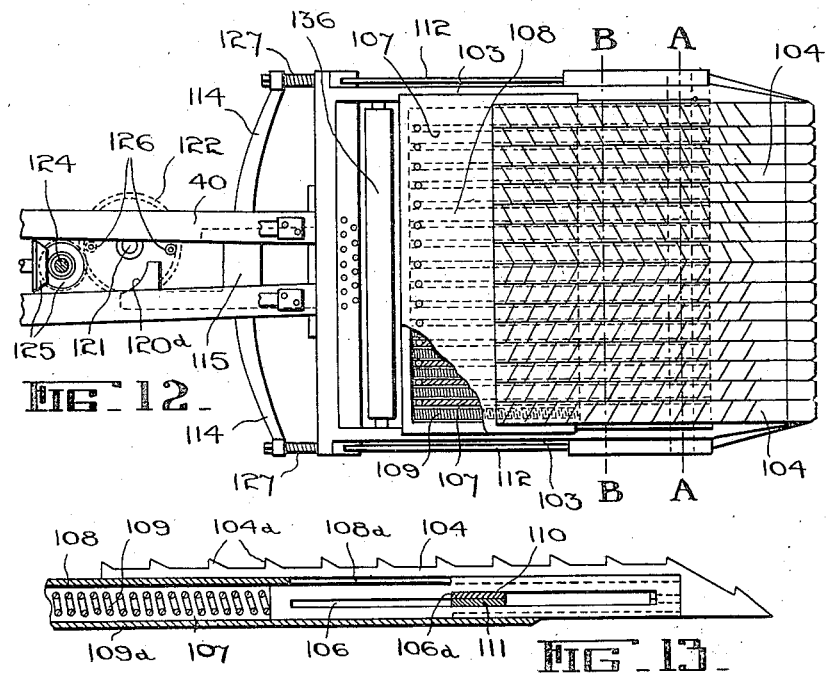
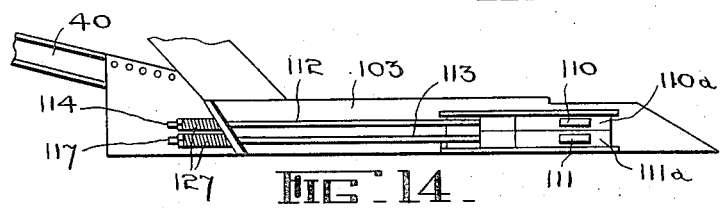
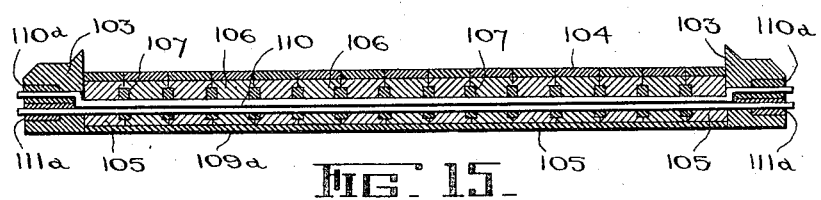
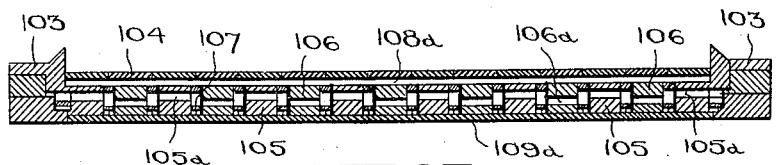
Inventor
P. Groshek
By Marker Cleck
Attys Oct. 21, 1924.
P. GROSHEK
1,512,844
MATERIAL SHOVELING, TRANSPORTING, AND TRUCKING MACHINE
Filed Nov. 23, 1922   7 Sheets-Sheet 7
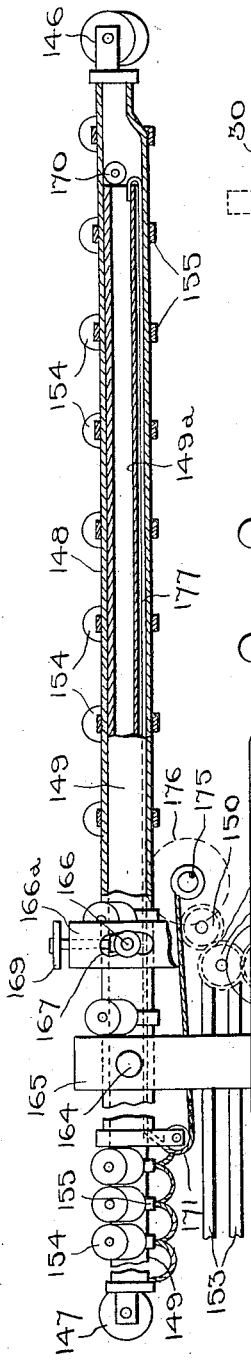
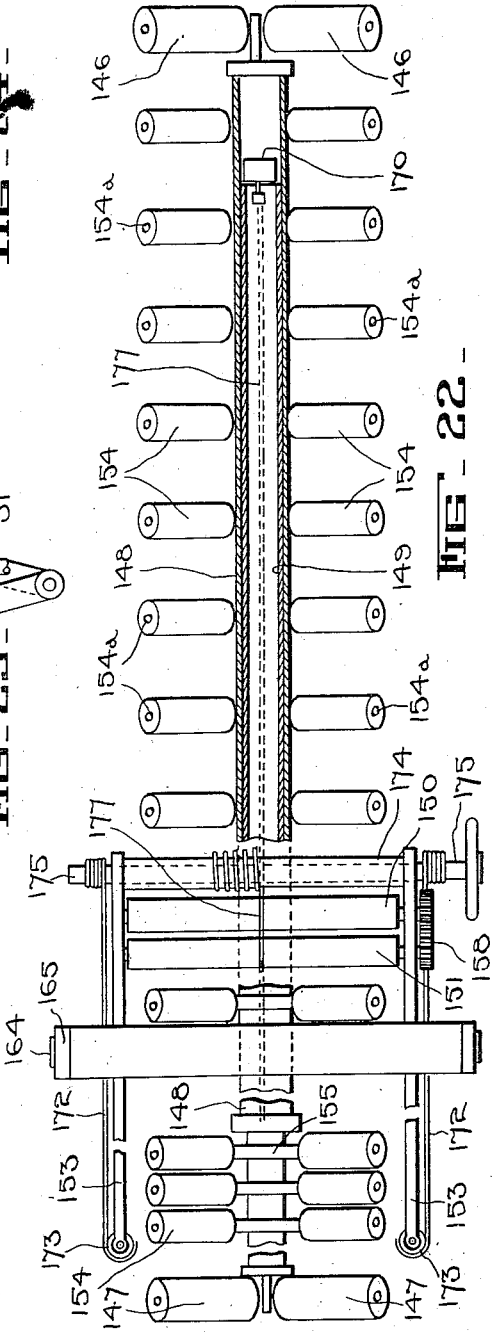
Inventor:
P. Groshek
By Marker Clerk
Attys Patented Oct. 21, 1924.

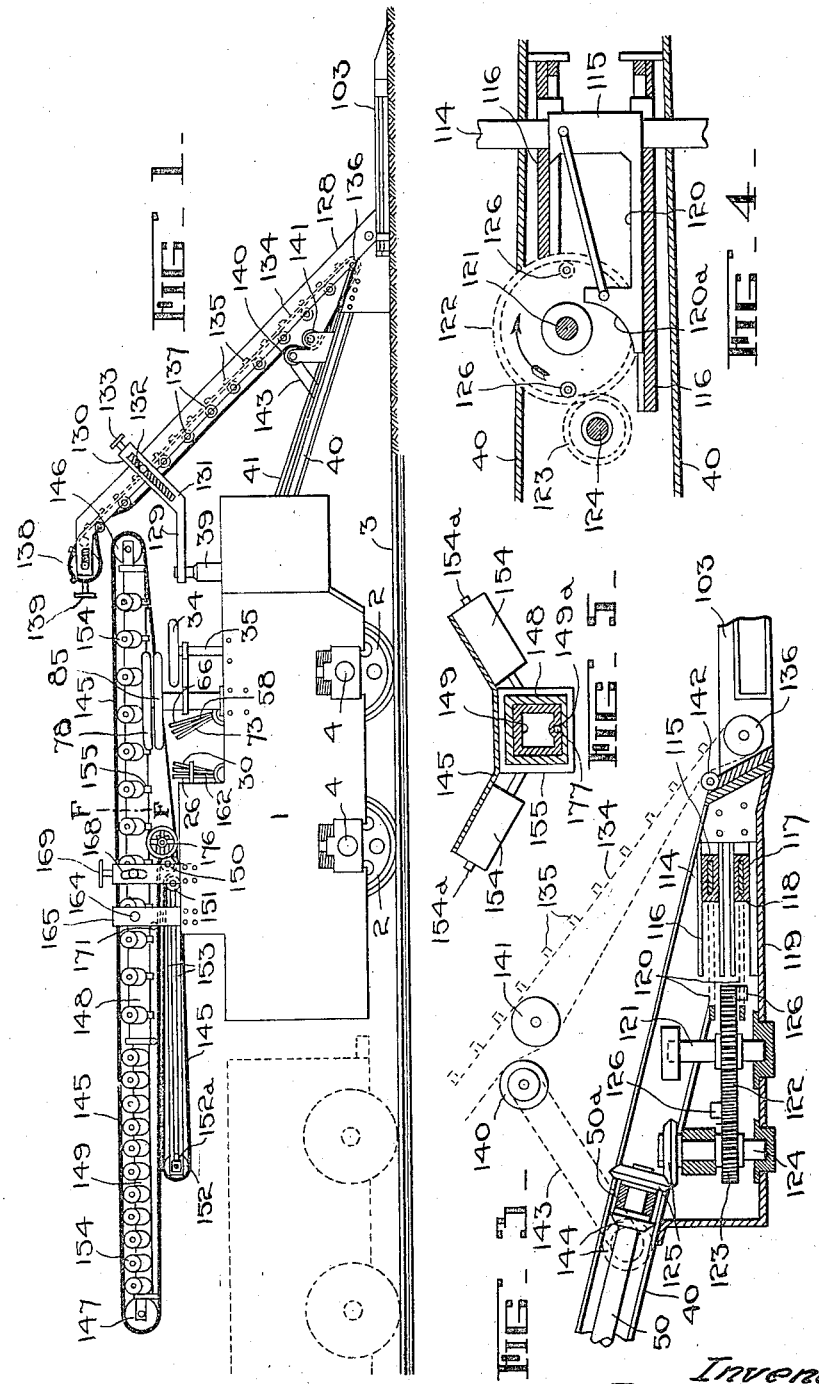

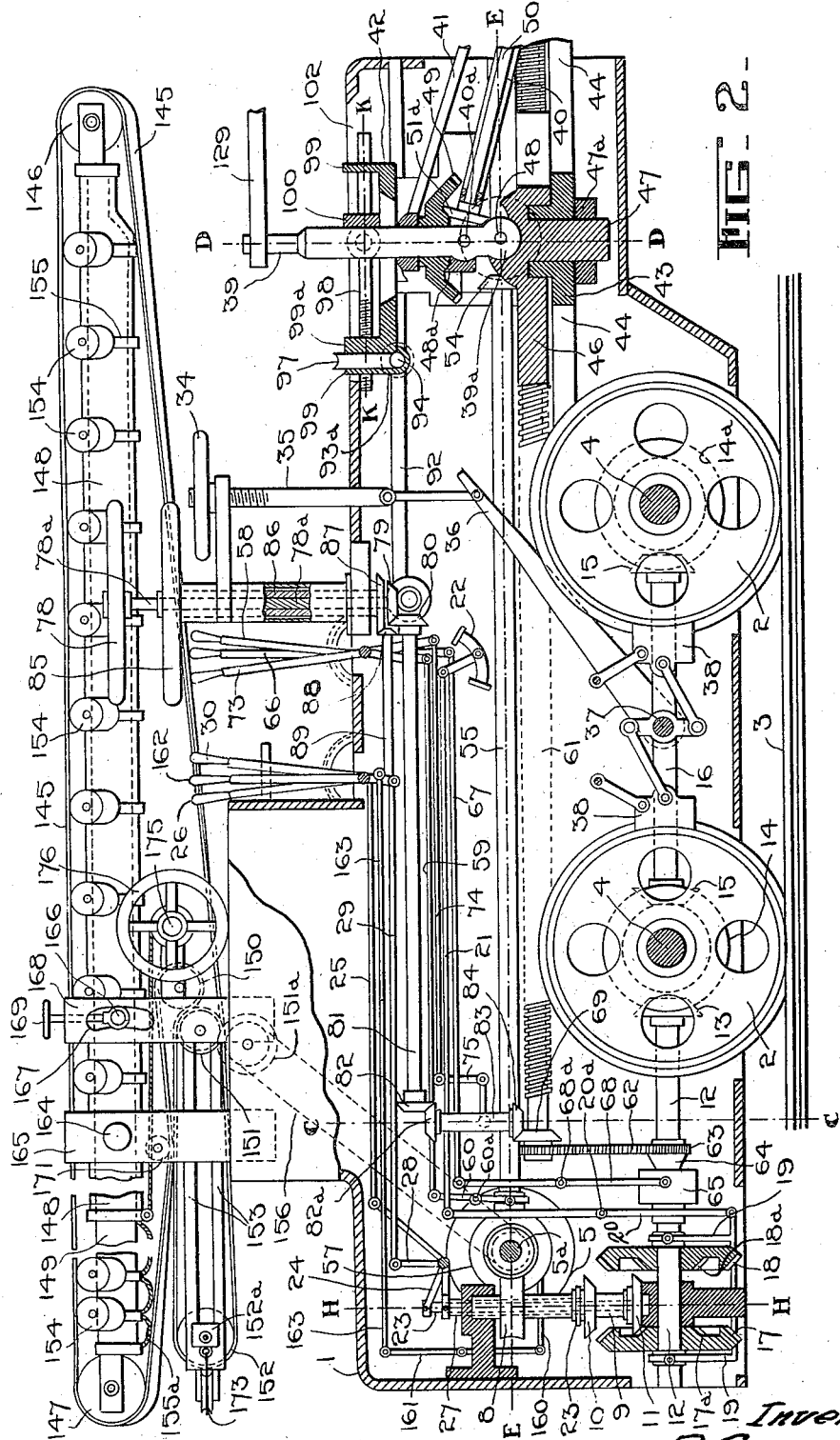

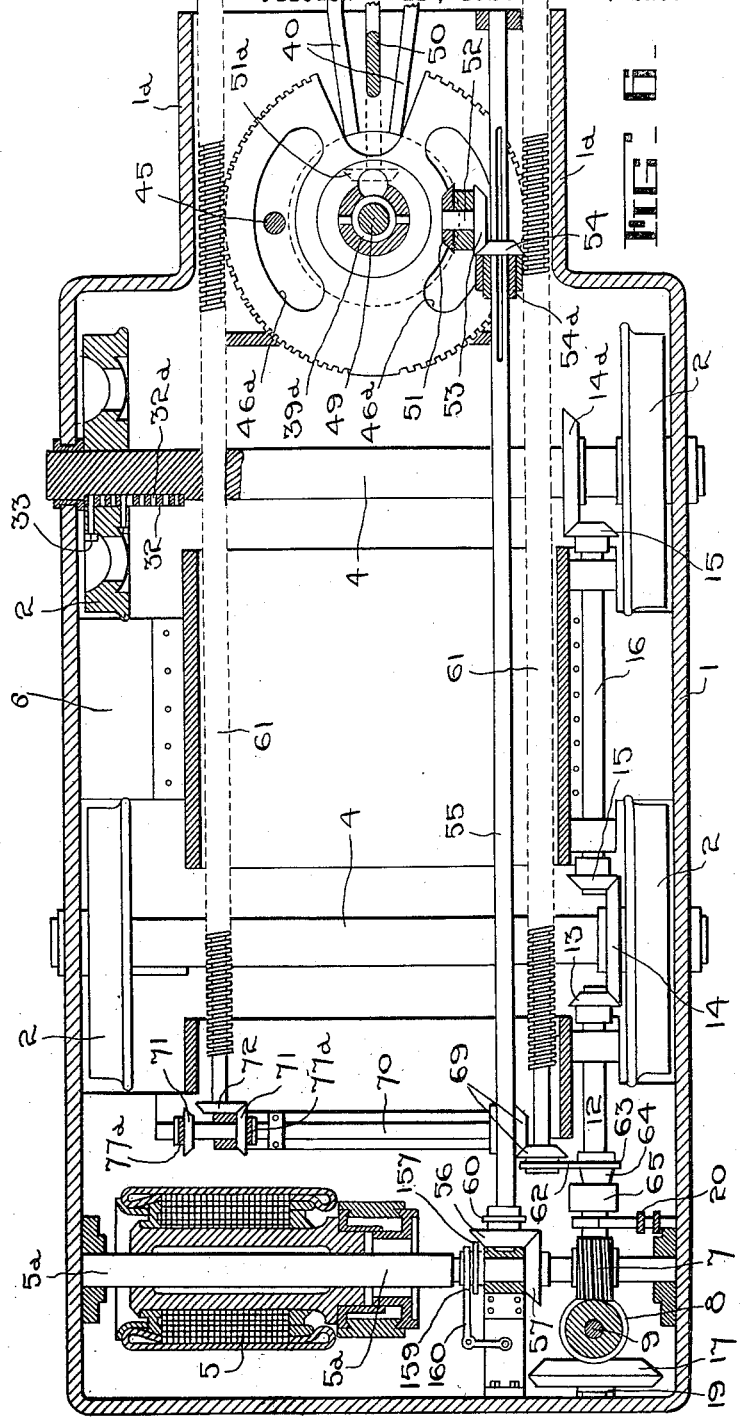

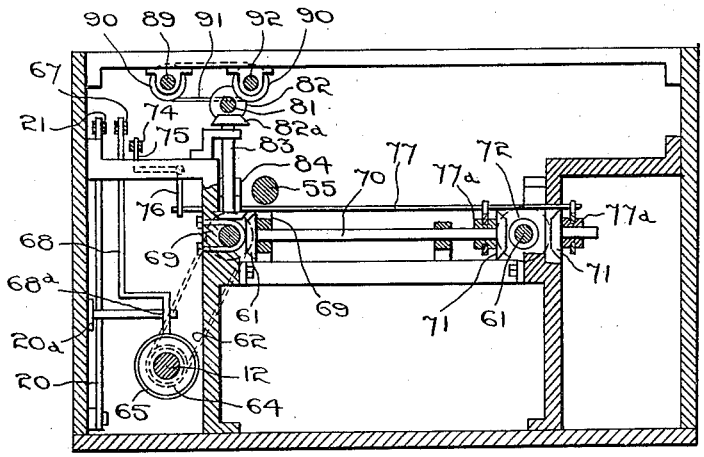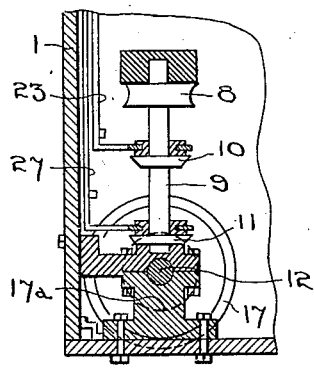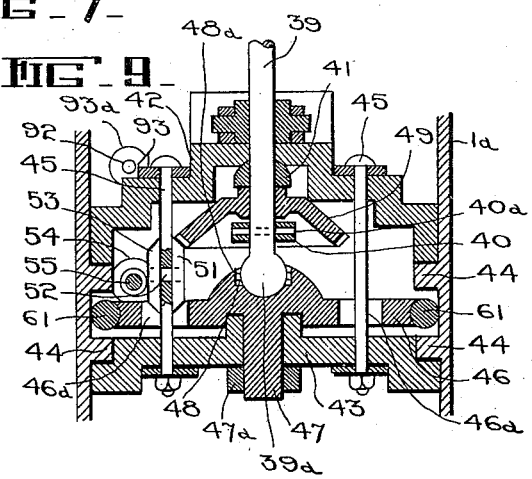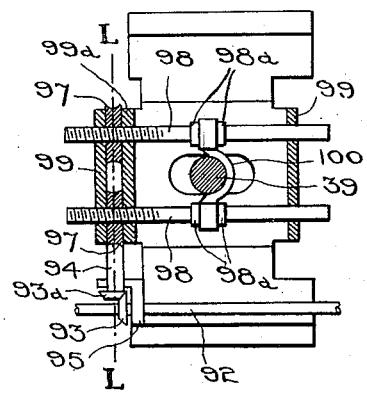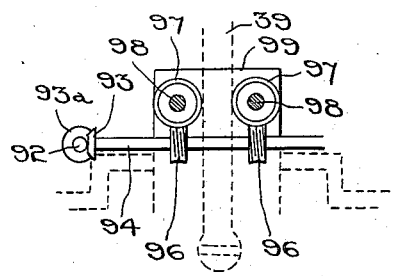

1,512,844

UNITED STATES PATENT OFFICE.

PAUL GROSHEK, OF GLEN MASSEY, NGARUAWAHIA, AUCKLAND, NEW ZEALAND.

MATERIAL SHOVELING, TRANSPORTING, AND TRUCKING MACHINE.

Application filed November 23, 1922. Serial No. 602,871.

*To all whom it may concern:*

Be it known that PAUL GROSHEK, a citizen of the Kingdom of Serbs, Croates, and Slovenes, residing at Glen Massey, Ngaruawahia, Provincial District of Auckland, Dominion of New Zealand, has invented an Improved Material Shoveling, Transporting, and Trucking Machine, of which the following is a specification.

This invention relates to apparatus for shoveling, transporting and trucking loose coal and the like material and has for its object the provision of an improved machine for the aforesaid purpose.

According to the invention the improved machine comprises a truck provided with its own means of propulsion, a mechanically operated shovel, an elevator for transferring the material being dealt with from the shovel to a conveyor, designed to deliver the raised material into trucks for transportation, or to where else desired.

The main features of the invention comprise the construction and operation of the shovel, the means for mounting the latter so as to enable it to be adjusted horizontally and vertically to suit its work and the construction and means for enabling the conveyor to be adjusted, whereby the delivery of the material from same can be varied at will.

The shovel comprises a frame between the side members of which blades are arranged to operate longitudinally of the shovel for the purpose of working the material towards the elevator which ascends from the rear of the shovel.

The shovel blades are operated in two sets through an inclined drive from the motor of the machine, alternate blades being simultaneously withdrawn against the action of springs, and then released to jump forward into the heap of coal or the like being dealt with. The upper surfaces of the shovel blades are formed with ridges or projections thereon, designed to give the coal or the like a tendency to work towards the centre of the shovel, in order to prevent its being worked over the sides of the latter, by the quick indrawing strokes of the blades, and the still quicker return strokes thereof.

The shovel is mounted on the lower end of girder bars, supported at their upper ends from a pillar at one side of the truck and rising from a worm wheel placed on the flat on a slide operable in horizontal guides lengthways of the machine.

Screws extending lengthways of the machine, engage the worm wheel at diametrically opposite points and are capable of being operated to impart turning movement to the worm wheel and the pillar for the purpose of swinging the shovel laterally and also so as to cause the slide which carries the worm wheel to be given movement through the latter longitudinally of the machine, in order that the shovel may be drawn inwards or be projected from the machine, when required.

The upper conveyor comprises an endless belt passing around end rollers and intermediate supporting rollers inclined to give the belt a trough like cross sectional shape said rollers being mounted on a telescopic frame, one member of which is provided with trunnions, adapted to rest in supports rising from the top of the truck, whereby the upper side of said conveyor can be given a slope.

Projections from the telescopic frame enter slotted members rising from the truck, said members being provided with screws and hand wheels, to facilitate and control the adjustment of the conveyor.

Provision is made for taking up the slack of the endless belt, when the latter is shortened by providing a sliding roller operable in horizontal guides below the moving member of the telescopic frame. The endless belt after it leaves the roller at the delivery end of the conveyor passes below the telescopic frame and then around driving rollers and outwards to pass around the sliding roller before returning to the roller at the material receiving end of the conveyor. The extension and contraction of the upper conveyor is performed by the operation of a handwheel on a shaft carrying drums around which ropes are wound in reverse directions, one of said ropes being attached to the telescopic frame so that on the handwheel being turned to wind in said rope the upper conveyor is caused to lengthen or to extend, while the other ropes which are attached to the bearings of the sliding roller, are allowed to unwind. Reverse turning movement of the aforesaid handwheel causes the ropes attached to the bearings of the sliding roller to be wound in, the effect of which is to draw the sliding roller outwards and shorten the conveyor, while during such movement, the rope attached to the telescopic frame is unwound from its drum.

The machine is provided with gearing clutches, levers, handwheels, and other necessary mechanism essential for the operation and control of the machine under power, or by hand.

The machine will now be described in detail in conjunction with the accompanying drawings in which:—

Figure 1 is an elevation of the complete machine.

Figure 2 an enlarged part sectional elevation of the machine.

Figure 3 is a detail view in sectional elevation of the gearing for imparting reciprocatory motion to the shovel blades.

Figure 4 a plan view of the gearing shown in Figure 3.

Figure 5 a cross section (enlarged) of the conveyor, taken on the line F—F, Figure 1.

Figure 6 is a sectional plan view taken on the line E—E, Figure 2.

Figure 7 a cross sectional elevation of the machine taken on the line C—C, Figure 2.

Figure 8 is a part cross sectional elevation of the machine taken on the line H—H, Figure 2.

Figure 9 an enlarged part sectional elevation of the adjustable conveyor supporting means taken on the line D—D, Figure 2.

Figure 10 is a part sectional plan view on the line K—K, Figure 2.

Figure 11 is a part sectional elevation taken on the line L—L, Figure 10.

Figure 12 a plan view of the shovel, shown broken.

Figure 13 is a part longitudinal sectional elevation (enlarged) of the shovel.

Figure 14 a side elevation of the shovel.

Figure 15 an enlarged cross sectional elevation of the shovel on line A—A, Figure 12.

Figure 16 an enlarged sectional elevation of the shovel taken on line B—B, Figure 12.

Figure 17:
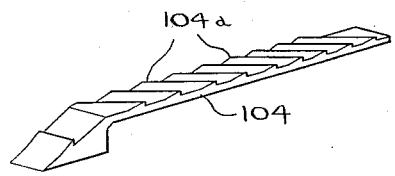

Figure 17 is a perspective view of a shovel blade.

Figure 18:
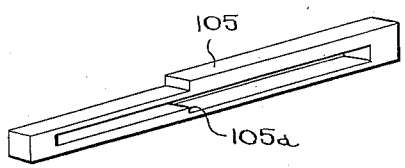

Figure 18 a perspective view of one of the sliding shovel bars.

Figure 19:
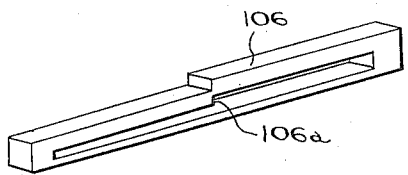

Figure 19 a perspective view of another of the sliding shovel bars.

Figure 20:
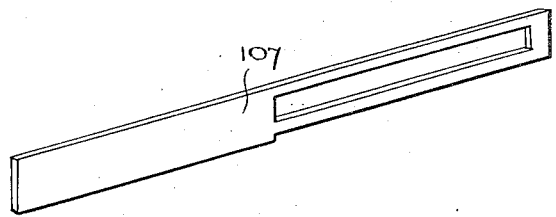

Figure 20 a perspective view of the guide plate.

Figure 21 a part sectional elevation of the upper conveyor.

Figure 22 a part sectional plan view of the same.

Figures 23 and 24 are an elevation and plan view respectively of means for locking the gear shifting levers.

The machine comprises a truck 1 mounted on flanged wheels 2 adapted to run on rails 3, said wheels 2 being a fixture on their axles 4.

The wheels 2 are driven to cause the machine to travel along the rails 3 from an electric motor 5 drawing energy from a battery located at 6 (Figure 6) the motor shaft 5ª being mounted crossways of the truck and having keyed thereon a worm 7 which drives a worm wheel 8 keyed on the upper end of a short vertical shaft 9 (Figures 2 and 6) on the lower portion of which bevel wheels 10, 11 are mounted so as to be capable of being slid thereon, but always turning with same. Below the vertical shaft 9 is a horizontal shaft 12 on one end of which is keyed a bevel wheel 13 which meshes with a bevel wheel 14 keyed on the axle 4 of the first pair of wheels 2. The axle 4 of the other pair of wheels 2 is driven from the bevel wheel 14 of the first pair of wheels 2, through further bevel wheels 15 keyed on a further horizontal shaft 16, one of said wheels 15 meshing with the wheel 14 on the axle 4 of the first pair of wheels 2, while the other of said wheels 15 meshes with a further bevel wheel 14ª of the axle 4 of the other pair of wheels 2.

Slidably mounted on the shaft 12 but turning therewith are a pair of bevel wheels 17, 18 which face each other, the wheel 17 having formed on its inner face a bevel wheel 17ª of smaller diameter, while the wheel 18 has likewise formed on its inner face a bevel wheel 18ª of smaller diameter.

These wheels 17, 18 are mounted in a sliding fork 19, so as to always move together in whatever direction the sliding fork 19 is moved the latter being connected to the lower end of a lever 20, fulcrumed at 20ª and connected at its upper end to a rod 21, which is actuated from an operating foot lever 22.

The bevel wheel 10 is held in the forked lower end of a vertical rod 23 connected at its upper end to one leg of a bell crank lever 24, the other leg of which is connected by a rod 25 with an operating hand lever 26.

Similarly the bevel wheel 11 is held in the forked lower end of a vertical rod 27, connected at its upper end to one leg of a bell crank lever 28 the latter being connected by a rod 29 with an operating hand lever 30.

By sliding the wheels 17 and 18, so that the wheel 17 meshes with the wheel 10, or so that the smaller wheel 17ª meshes with the wheel 11, while the wheel 18 and its smaller wheel 18ª clear said wheels 10, 11 the truck 1 is caused to travel along the rails 3 in one direction, while on the other hand if the wheels 17, 18 be moved so that the wheel 18, or its smaller wheel 18ª meshes with the wheel 10 or 11 respectively, travel of the truck in the reverse direction is brought about.

When the wheel 10 is lowered so as to mesh with either the wheel 17 or 18, a slow travelling speed is obtained and if the wheel 11 be lowered to mesh with either of the smaller wheels 17ª, 18ª, a faster travelling speed is obtained.

In order to prevent the possibility of both of the wheels 10, 11 being lowered or brought into use at the same time, the hand levers 26, 30 are provided with a lock 31, whereby only one of them can be operated at a time.

The lock 31 (Figures 23 and 24) comprises a horizontal bell crank lever mounted so that when in the position shown in full, the lever 26 cannot be moved, owing to one of the legs of said bell crank lever engaging against the hand lever 30, and similarly when the bell crank lever occupies the position shown dotted, the lever 26 is freed, while the lever 30 becomes locked against movement.

In order to provide for adjustment of the running wheels 2 to suit tracks of different gauges, the wheels 2 on the side of the truck opposite to that on which the shafts 12 and 16 are mounted, are fitted so as to be slidable on the axles 4.

To enable the said wheels to be so slid and yet turn with the axles 4, the latter are provided with feather keys 32, on which keyways in the hubs of the wheels pass, said feather keys 32 containing a series of holes 32ª in their outer surfaces into any of which holes setscrews 33 passing through the wheel hubs can be screwed in order to lock the wheels against lateral movement on the axles 4, once they have been adjusted to the gauge required.

A handwheel 34 through which the screwed upper end of a rod 35 passes is capable of being turned to raise or to lower said rod, in order to impart movement to a lever 36 keyed on a cross shaft 37 for the purpose of causing brake blocks 38 to press against, or to be moved from contact with the wheels 2 at the same side of the truck as the shafts 12 and 16.

The shovel is mounted at the lower ends of inclined girder bars 40 and stays 41 (Figures 1, 2, 6 and 12) attached at their upper ends to a pillar 39, located at the end of the truck 1 remote from the motor 5. At said end of the truck and slidable horizontally lengthways of the truck, between vertical side members 1ª of the latter (Figure 9) are upper and lower slides 42, 43. These slides are clamped or held together, and also on guides 44 on the inner sides of the vertical side members 1ª by bolts 45.

On the lower slide 43 a worm wheel 46 is arranged, said wheel containing radial slots 46ª through which the bolts 45 pass and having projecting through the slide 43 a boss 47 which is screwed to take a nut 47ª.

The pillar 39 has at its lower end a ball 39ª which is accommodated in a raised portion of the worm wheel 46.

A horizontal pin 48 passes through the ball 39ª at right angles to the line of projection of the shovel from the pillar 39, and is accommodated at its ends in recesses 48ª in the raised portion of the wheel 46 in order to ensure the latter and the pillar 39 turning together horizontally, the recesses 48ª are made deeper than the diameter of the pin 48 and extend both above and below the latter when it is horizontal in order to permit the pillar 39 to have slight rocking movement in the direction of the pin 48.

The upper ends of the girder bars 40 are connected to the pillar 39 by a pin 40ª passing horizontally through the latter while the stays 41 are connected to said pillar 39 a distance above the upper ends of the girder bars 40.

Loosely mounted on the pillar 39 is a bevel wheel 49 having formed integral with its underside a smaller bevel wheel 49ª, which meshes with a bevelled wheel 51ª on the inclined driving shaft 50 to the shovel, said shaft 50 being mounted in bearings 50ª secured between the upper and lower ends of the girder bars 41.

The larger bevel wheel 49 meshes with a bevel wheel 51 (Figures 6 and 9) keyed on the inner end of a short horizontal shaft 52 mounted in a bolt 45, a further bevel wheel 53 being keyed on the outer end of said shaft 52.

The bevel 53 meshes with a further bevel wheel 54 (Figures 2, 6 and 9) slidably mounted on and turning with a shaft 55 extending longitudinally of the truck 1, said shaft 55 having mounted on its end remote from the pillar 39 a bevel wheel 56 which also turns with the shaft 55 and is capable of being slid into or out of driving engagement with a bevel wheel 57 keyed on the shaft 5ª of the motor 5.

A bracket 54ª projecting downwards from the upper slide 42 grips the wheel 54 and while permitting the latter to turn, prevents it from sliding on the shaft 55 except when the slide 42 is given movement lengthways of the machine.

The operation of the inclined shaft 50 which transmits to the shovel the necessary motion for actuating the blades thereof, is controlled from the hand lever 58 through a rod 59 to a lever 60 (Figure 2) which is fulcrumed at 60ª and has a forked lower end to engage the boss of the wheel 56, movement of the lever 60 causing the wheel 56 to slide on the shaft 55 into or out of engagement with the wheel 57, according to the operation of the hand lever 58.

In order to permit the shovel to be projected from the machine, or to be drawn into same, when required, means are provided for imparting movement lengthways of the machine to the slides 42, 43 and parts carried thereon.

These means comprise screws 61 running lengthways of the truck and engaging the worm wheel 46 at diametrically opposite points.

Between one of the screws 61 and the shaft 12 a chain drive 62 is provided (Figures 2, 6 and 7) the sprocket wheel 63 on the shaft 12 being attached to a tapered male clutch section 64 loosely mounted on said shaft 12 but having no end movement thereon.

A female clutch section 65 surrounding said shaft is tapered to fit on the male section 64, and is mounted so as to slide on and always turn with said shaft 12.

The female clutch section 65 is operated to engage the male section 64 and lock the sprocket 63 to the shaft 12 and so drive the screw 61, from a hand lever 66, which is connected by a rod 67 to a lever 68 fulcrumed at 68ª and having a forked lower end which engages the female clutch section 65.

The latter can therefore be operated to cause the screw 61 to turn with the shaft 12, or so that it will remain stationary.

The other screw 61 is driven from the first screw 61 through bevel gear 69 (Figures 6 and 7) a shaft 70, a pair of bevel wheels 71 and a single bevel wheel 72 keyed on the end of the screw.

The wheels 71 are slidably mounted on the shaft 70 and both turn with same, only one at a time meshing with the wheel 72.

When the inner end of the wheels 71 is in mesh with the wheel 72 both screws 61 turn in the same direction and movement of the worm wheel 46 slides 42, 43 and parts attached thereto lengthways of the machine is obtained.

When the outer of the wheels 71 meshes with the wheel 72, the screws 61 turn in reverse direction and rotation is imparted to the worm wheel 46 and pillar 39, thereby causing lateral or swinging movement to be imparted to the shovel.

The wheels 71 are slid on the shaft 70 to cause the screws 61 to rotate in the same or opposite directions by the operation of a hand lever 73, connected by a rod 74 with one leg of a bell crank lever 75 the other leg of which transmits movement through a further bell crank lever 76 (Figure 7) operating a sliding cross rod 77, carrying forks 77ª engaging the wheels 71.

The direction of rotation of the screws 61 can be reversed by sliding the wheels 17, 18 on the shaft 12, and the speed can also be varied by changing the wheels 10, 11.

Lateral or swinging movement of the shovel can also be caused by turning the hand wheel 78 the latter having keyed on the lower end of its shaft 78ª a bevel wheel 79 which transmits motion through bevel wheels to a bevel wheel 80 keyed on one end of a horizontal shaft 81. A further bevel wheel 82 keyed on the other end of the shaft 81 meshes with a bevel wheel 82ª on the upper end of a vertical shaft 83 the latter having keyed on its lower end a further bevel wheel 84 which meshes with the bevel wheel 69 on the screw 61.

Raising or lowering or vertical adjustment of the shovel, is carried out by rocking or moving the pillar 39 on the worm wheel 46 in the direction of the line of projection of the shovel from the truck. The means provided for obtaining this vertical adjustment comprise a hand wheel 85 mounted on the upper end of a hollow shaft 86 which surrounds the shaft 78ª of the wheel 78. On the lower end of the hollow shaft 86 is a bevel wheel 87 which meshes with a bevel wheel 88 on a shaft 89 the latter driving through chain wheels 90 and a chain 91, a shaft 92 parallel with the shaft 89 (Figures 2, 7, 10 and 11).

The shaft 92 drives through bevel gears 93, 93ª a cross shaft 94 mounted on the upper slide 42, the wheel 93 turning with said shaft and being caused to slide thereon with the guide 42 by a bracket 95.

The cross shaft 94 has formed or keyed thereon worms 96 each of which works in worm wheels 97 screwed internally to work on screwed portions of horizontal shafts 98 capable of end movement in supports 99 on the slide 42. The shafts 98 are provided with bearings 98ª for the ends of a yoke 100 which passes around the outside of the pillar 39.

The internally screwed worm wheels 97 are held against lateral or side movement by being located between a support 99 and a cross member 99ª on the slide 42.

On turning the hand wheel 85 the rotary motion transmitted through the wheels 93, 93ª from the longitudinal shaft 92 to the cross shaft 94 causes the worms 96 to turn the internally screwed worm wheels 97 on the screwed shafts 98, with the result that the latter are given end movement to either cause the yoke 100 to exert a pull on the pillar 39 whereby the shovel is raised, or to allow the pillar 39 to move in the reverse direction under the weight of the descending shovel. Movement of the pillar 39 in the line of projection of the shovel from the truck is permitted by an opening 101 in the upper slide 42, and an opening 102 in the top of the truck.

The feathering of the wheel 93 on the longitudinal shaft 92, preserves the engagement of the wheels 93 and 93a with each other, when the slides 42, 43 and parts attached thereto are moved inwards or outwards on the screws 61 turning in the same direction.

The shovel (Figures 1, 3, and 12 to 20) comprises a frame 103 mounted on the lower or outer ends of the girder bars 40 and in which operate lengthways of the shovel, the blades 104.

The blades 104 are formed as shown in (Figure 17) each alternate blade being mounted on a sliding bar 105 slotted as shown in Figure 18 while the other of said blades 104 are each mounted on a sliding bar 106 slotted as shown in Figure 19.

The upper surfaces of the blades 104 are formed with inclined cross ribs or projections 104a, all the ribs or projections 104a on the blades 104 to one side of the centre of the shovel running in the same direction towards the centre of the shovel's outer edge and all the ribs or projections 104a on the blades 104 at the other side of the shovel centre also running in the same direction and towards the centre of the shovel's outer edge.

The outer ends of the blades 104 are sharpened as shown in the drawing.

The sliding bars 105 and 106 work between guide plates 107 slotted as shown in Figure 20 said plates being secured edgeways between upper and lower plates 108, 109a respectively.

The bars 105 and 106 are in each case, recessed in both sides to accommodate and work on the guide plates 107 and are also made with less height or depth at their rear portions to provide a space 108a (Figures 13 and 16) between their upper edges and the blades 104, said space being necessary, because when the blades 104 move backwards, they pass above the upper plates 108, while the sliding bars 105 and 106 pass below same.

Compression springs 109 placed between the guide plates 107, and located between the rear ends of the bars 105 and 106 and the back of the frame 103 are compressed by the bars 105 and 106 moving rearwards.

Alternate blades 104 are drawn backwards together against the action of their springs 109, by movement of cross bars 110, 111 one above the other and both of which pass through the slots in the bars 105 and 106, and the slotted guide plates 107, the slots in the latter being equal in depth to the widest portions of the slots in the bars 105 and 106, or to the thickness of both cross bars 110, 111.

The ends of the upper cross bar 110 are secured in slide blocks 110a operated by rods 112, and working lengthways of the shovel in guides in the side members of the frame 103 thereof, while the ends of the lower cross bar 111 are secured in slide blocks 111a operable in guides in said frame members by rods 113.

The cross bars 110, 111 are moved rearwards alternately by means which will shortly be described and when the upper bar 110 moves rearwards it engages each sliding bar 106 that is each alternate bar at 106a, it forces them all with the blades 104 they carry back together against the actions of their springs 109, the wider portions of the slots in said bars 106 passing on the cross bar 111 and not interfering with or actuating same. The bars 106 and blades 104 secured thereto are shot forward again by the action of the springs 109 on a release to be hereinafter described being effected.

Similarly when the lower bar 111 is moved rearwards it engages each bar 105 that is each alternate bar, at 105a, and moves them all with the blades 104 they carry rearwards against the action of the springs 109, to be shot forward again by the latter on a release as aforesaid being effected.

The rods 112 of the upper cross bar 110 are connected to a bridle 114 at the rear of the shovel, said bridle passing through a cross head 115 operable in guides 116 provided in the lower portions of the girder bars 40 which support the shovel (Figures 3 and 4).

The rods 113 of the lower cross bar 111 are connected to a bridle 117 at the rear of the shovel said bridle passing through a cross head 118 operable in guides 119 in the lower portions of the girder bars 40.

Each cross head is formed with a projecting plate 120 having shaped as at 120a (Figure 4) to clear the vertical shaft 124 when moved back.

Mounted vertically in a support from the bars 40 is a short vertical shaft 121 on which is keyed a spur wheel 122 driven by a pinion 123 on a vertical shaft 124 which receives motion through bevel gear wheels 125 from the lower end of the inclined shaft 50.

The wheel 122 has mounted thereon diametrically opposite rollers 126, one roller being on the upper side of said wheel and the other roller on the lower side of same.

The wheel 122 is adapted to be driven in the direction indicated in Figure 4 and during the course of its rotation the upper roller 126 strikes the back of the projection 120 from the cross head 115 and draws back the bridle 114, rods 112, cross bar 110, sliding bars 106 and blades 104 carried by the latter, whereby the springs 109 relative to said blades are compressed. Further movement of the wheel 122 causes the upper roller 126 to clear the projection 120 of the cross head 115, whereupon the blades 104 controlled or actuated through the latter are propelled or forced forward by their springs 109.

The lower roller 126 engages the projection 120 from the lower cross head 118 actuating the other blades 104 in a similar manner, and the rollers 126 being diametrically opposite each other the two sets of blades 104 are operated at regular intervals and once each during each revolution of the wheel 122.

Springs 127 (Figures 12 and 14) are provided on the rods 112 and 113 for the purpose of absorbing shock when the blades on being propelled forward by the springs 109 do not encounter resistance such as will occur on the shovel running empty.

In practice the shovel is put into position in front of the coal or other material to be shifted, and is forced into the head by forward movement of the machine.

Each set of blades 104 on being drawn backwards owing to the ribs or projections 104a thereon draw coal or the like back with them and when released and propelled sharply forward again by the springs 109 pass with a quick movement beneath the coal to obtain a fresh grip and do not under normal circumstances project beyond the outer edge of the shovel, but occupy their normal position flush with the outer edge of same.

The angle or inclination of the ribs or projections 104a results in the coal or the like tending to work towards the shovel centre and away from the sides.

The elevator for delivering the material from the shovel up on to the horizontal conveyor, comprises a frame 128 (Figures 1 and 3) hinged at its lower ends to the rear of the shovel, and supported at its upper portion by a horizontal arm 129 from the pillar 39. The arm 129 terminates in a fork 130 between the members of which the frame 128 is located, said fork members also containing radial slots 131 the curves of which are struck from the centre of pivoting of the lower end of the frame 128. Projections 132 from the frame 128 enter the slots 131, and can be moved therein in order to alter the angle of inclination of the frame by means of screws 133.

The elevator belt 134 is of link construction with cross ribs or slats 135 projecting therefrom and passes around a roller 136 on the rear of the shovel, over rollers 137 on the frame 128, around a roller 138 mounted in bearings adjustable in slots in the upper end of the frame, by screws 139 over a ground driving roller 140 at the back of the frame, and below an idle roller 141 and over a roller 142 at the lower end of the frame. The upper roller 138 is made adjustable in order to permit the belt 134 to be slackened or to be tightened as required, when the slope of the conveyor is being altered, while the idle roller 141 keeps the belt 134 in driving contact with the grooved driving roller 140, which in turn is driven through a chain drive 143 and bevel gear 144 (Figure 3) from the inclined shaft 50 to the shovel.

The upper or horizontal endless conveyor belt 145 which receives the coal or other material from the elevator belt 134 and delivers it into trucks or to where else desired passes around rollers 146, 147 (Figures 1, 2, 21, 28) on the ends of a frame comprising telescoping members 148, 149 respectively and from the rollers 147 passes inwards below the frame member 149 over and around a roller 150 and then upwards over another roller 151 to pass outwards around a roller 152 the bearings 152a of which are slidable in horizontal guides 153. From the sliding roller 152 the underside of the belt 145 passes to the rollers 146 at the end of the frame member 148. The upper side of the belt 145 is supported by rollers 154, the spindles 154a of which incline upwards and outwards from brackets 155 on the frame members 148, 149 so that the rollers 154 are set as shown in Figure 5 and give the upper side of the belt 145 a trough like formation in order to prevent the material being handled from passing over the sides of the conveyor. The rollers 146 and 147 are also inclined in a manner similar to the rollers 154. The brackets 155 on the frame member 148 are equally spaced apart and are a fixture thereon while the brackets 155 on the frame members 149 are slidable on the latter and are connected by a rope 155a attached to the outer end of the frame member 149.

The belt 145 is driven by a chain 156 from a chain wheel 157 loosely mounted on the shaft 5a (Figure 6) of the motor 5, to a chain wheel 151a geared with the roller 151, the latter being geared with the roller 150.

The chain wheel 157 (Figures 2 and 6) is adapted to be clutched to the shaft 5a per medium of a clutch 159 slidably keyed on the shaft 5a, through a bell crank lever 160, one leg of which is connected to the lower end of a centrally pivoted lever 161, the latter being operated from the hand lever 162 through a rod 163.

These means enable the belt 145 to be made to run or remain stationary as required.

The frame member 148 into which the member 149 slides is provided with trunnions 164, which rest in supports 165 rising from the top of the truck 1.

Further projections 166 from the frame member 148 are entered in slots 167 in other supports 168 rising from the truck 1, the slots 167 each having a radius struck from the trunnions 164, thereby enabling the frame members 148, 149, to be swung vertically on the trunnions 164. Means for adjusting the frame member 148 and for locking same in position when adjusted comprise hand screws 169 passing through the supports 168 and connected to rings 166ª on the projections 166.

The inner sliding frame member 149 has mounted at its inner end a roller 170 which bears upwards against the top of the outer stationary frame member 148, the latter having mounted underneath its outer end a roller 171 on which the sliding member 149 bears.

These rollers 170 and 171 facilitate the sliding of the member 149 into and out of the member 148.

The means for lengthening and shortening the belt 145 comprise ropes 172 attached to the bearings 152ª of the sliding roller 152 and passing around guide pulleys 173 on the ends of the guides 153, said ropes 172 being wound on the ends of a drum 174 keyed on a spindle 175 mounted crossways on the guides 153.

The spindle 175 is provided with a hand wheel 176 and when the drum is turned to wind in said ropes 172, the pull exerted on the latter draws the sliding roller 152 outwards which action causes the upper side of the belt 145 to shorten. To bring about the expansion or lengthening of the upper side of the belt 145, a rope 177 is attached to the inner end of the inner or sliding frame member 149, said rope being accommodated in a groove 149ª (Figures 5 and 21) in the under side of said member and passing downwards over the roller 171 and thence to the drum 174 on which it is wound the reverse way to the ropes 172.

As the rope 177 is wound in to cause the inner sliding frame member 149 to move outwards and so lengthen the upper side of the belt 145, the ropes 172 unwind from the drum 174 and permit the sliding roller 152 to move inwards whereby the section of belting between the rollers 151 and 152 shortens as the upper side of the belt lengthens.

On the other hand as the ropes 172 are wound onto the drum 174 to draw out the sliding roller 152 and lengthen the section of belt between the rollers 151 and 152 and so shorten the upper side of the belt, the rope 177 is unwound from the drum 174 to permit the inner sliding frame member 149 to be forced into the stationary frame member 148 by the shortening of said upper side.

As the frame member 149 moves outwards the rope 155ª attached to the brackets 155 and the end of the member 149, ensures the rollers 154 being evenly spaced.

I claim—

1. A machine of the character described comprising a truck, a shovel projecting therefrom including a stationary frame adapted to be arranged parallel with and on the ground, material shifting blades in the frame, an elevator, an extensible conveyor, and means for synchronously operating the blades, elevator and conveyor.

2. A machine of the character described comprising a truck, a shovel projecting therefrom including a stationary frame adapted to be arranged parallel with and on the ground, longitudinally shiftable blades in the frame adapted to be operated in sets for the purpose of working the material towards the rear of the shovel frame, an elevator rising rearwardly from the shovel frame, an extensible conveyor for receiving the material from the elevator and for delivering the material where required, and means for synchronously operating the blades, elevator and conveyor.

3. A machine of the character described including a shovel comprising sets of reciprocatory blades adapted to be drawn inwards from the shovel edge and to be sprung outwards for the purpose specified.

4. In a machine of the character described including a shovel according to claim 3, wherein the parts are operated in sets, said sets operating alternately.

5. A machine of the character described including a truck, a support therein, a shovel projecting from the support including a frame and reciprocatory blades therein, means for reciprocating the blades, and means for swinging the shovel support during operation of the blades.

6. A machine of the character described including a truck, a support thereon, a shovel projecting from the support and composed of a frame and reciprocatory blades therein, screw and worm gears for reciprocating the shovel support and for projecting the shovel from the machine and for drawing the shovel towards the machine, means for swinging the said support so as to swing the shovel laterally, and means for tilting the support so as to consequently tilt the shovel.

7. In a machine of the character described a truck, a shovel projecting therefrom comprising a sationary frame adapted to be arranged parallel with and on the ground, blades for reciprocating in the frame, and means for operating the blades.

8. In a machine of the kind specified, a shovel according to claim 7 wherein the blades are arranged in alternately operated sets.

9. In a machine of the character described, a shovel according to claim 7 wherein slotted guides are provided in the frame, and cross-bars reciprocating in the guides and having engagement with the blades for operating the same.

10. In a machine of the character described, a shovel according to claim 7 wherein the frame is provided with slotted guides, slotted blade operating cross-bars passing through the bars and the slotted guides, motor operated gearing for drawing said crossbars rearwardly and for releasing the crossbars when they reach their innermost positions, and springs for forcing the cross-bars forwardly when released.

11. In a machine of the character described, a shovel as claimed in claim 7 wherein the reciprocatory blades are provided on their upper surfaces with inclined ribs.

12. In a machine of the character described, a shovel including a frame having slotted guides, slotted blades in the frame, blade operating mechanism comprising an inclined shaft adapted to be operated through a gearing from a motor on the machine, toothed bevel wheels at the lower end of said shaft, a pinion and spur wheel operated through said bevel wheels, rollers on said spur wheels, cross-bars passing through the slotted plates and guides, rods connected to the outer ends of the cross-bars, cross rods connecting the inner ends of the last mentioned rods, cross head guides associated with the rods, cross heads operating in the cross head guides, plates projecting from the cross heads and operated in one direction by the rollers, and springs for imparting outward movement to the shovel blades.

13. In a machine of the character described a truck, a shovel support therein, a shovel including a frame supported forwardly of the truck by the support, and means for operating the support so that the shovel frame can be raised and lowered moved sideways and drawn towards and projected from the truck.

14. In a machine of the character described a truck, an oscillatory and tiltable shovel support slidably mounted therein, a shovel including a frame normally supported forwardly of the truck by the support, manually controlled motor driven means in the truck for oscillating and reciprocating the support, and manually controlled motor driven means for tilting the support so as to consequently raise and lower the shovel frame.

15. In a machine of the character described a truck, a shovel support therein, a shovel including a frame supported forwardly of the truck by the support, an elevator operably connected with and rising from the rear of the shovel frame, a vertically adjustable and extensible conveyor arranged horizontally above the truck for receiving the material from the elevator, means between the shovel support and the elevator for altering the angle of inclination of the elevator with respect to the shovel, and means for altering the length of the elevator with respect to the conveyor.

16. In a machine as claimed in claim 15, reciprocatory blades mounted in the shovel frame, a shaft mounted in the support for imparting reciprocatory movement to the blades, the elevator including grooved driving and idle rollers and an endless belt operating thereabout, and means for transmitting movement from the inclined shovel blade actuating shaft to the driving rollers so as to simultaneously operate the elevator.

17. A machine of the character described including a truck, a support mounted in the forward end thereof, a shovel including a frame adapted to be supported parallel with the ground and upwardly of the truck from the support, an upwardly inclined elevator extending rearwardly from the rear end of the shovel frame, means between the upper end of the elevator and the shovel support for supporting the elevator, pairs of opposed supports rising from opposite sides of the top of the truck, an endless extensible conveyor including a stationary section and an extensible section, the stationary section being rockably supported for vertical movement between one of the pairs of last mentioned supports, and means between the stationary section of the conveyor and the other pair of opposed supports for releasably maintaining the conveyor in the desired adjusted position with relation to the upper end of the elevator.

18. An arrangement as claimed in claim 17, wherein the endless conveyor includes inclined rollers projecting from opposite sides of the stationary and extensible sections, other rollers mounted at the opposed ends of the conveyor, an endless belt operating about both sets of rollers and having a trough-like formation, a slidable roller arranged beneath the extensible section over which the conveyor belt operates, and means for adjusting the position of the sliding roller longitudinally of the truck to vary the length of the upper side of the conveyor.

19. A machine of the character described including a motor operated truck, a support mounted in the upward end thereof, coacting shoveling and elevating means supported forwardly of the truck by the support, motion transmitting means between the main guiding means of the truck and the shoveling and elevating means for operating the latter, a vertically adjustable and extensible conveyor arranged horizontally above the truck, means for maintaining the conveyor in proper adjusted relation with respect to the elevating means, manually controlled motor operated means for extending and retracting the conveyor, and manually operable means for controlling the operation of the motor driven operating means for the shoveling and elevating means.

20. A machine as claimed in claim 17, wherein the endless conveyor includes an endless belt, fixed and slidable rollers on the stationary and extensible section over which the upper side of the belt passes, gear driving rollers over which the lower part of the belt passes, a longitudinally adjustable sliding roller over which the lower portion of the belt also passes, and means for adjusting the position of the sliding roller to shorten and lengthen the upper portion of the conveyor, substantially as and for the purposes set forth.

In testimony whereof I have affixed my signature in presence of two witnesses.

PAUL GROSHEK.

Witnesses:
ERNEST SMITH BALDWIN,
ERNEST WILFRED BOYCE CAREY.